United States Patent
Poeppel et al.

(10) Patent No.: US 10,343,631 B2
(45) Date of Patent: Jul. 9, 2019

(54) DECREASING AUTONOMOUS VEHICLE POWER CONSUMPTION

(71) Applicant: Uber Technologies, Inc., San Francisco, CA (US)

(72) Inventors: Scott C. Poeppel, Pittsburgh, PA (US); Nicholas G. Letwin, Pittsuburgh, PA (US); Sean J. Kelly, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/392,274

(22) Filed: Dec. 28, 2016

(65) Prior Publication Data

US 2018/0178741 A1 Jun. 28, 2018

(51) Int. Cl.
| | |
|---|---|
| *B62D 15/02* | (2006.01) |
| *G08G 1/14* | (2006.01) |
| *G05D 1/02* | (2006.01) |
| *G05D 1/00* | (2006.01) |
| *B60R 16/023* | (2006.01) |

(52) U.S. Cl.
CPC ...... *B60R 16/0236* (2013.01); *B62D 15/0285* (2013.01); *G05D 1/0088* (2013.01); *G05D 1/0291* (2013.01); *G08G 1/146* (2013.01)

(58) Field of Classification Search
None
See application file for complete search history.

(56) References Cited

U.S. PATENT DOCUMENTS

| | | | | |
|---|---|---|---|---|
| 8,989,954 B1* | 3/2015 | Addepalli | ............ | H04W 4/046 701/32.3 |
| 2013/0231824 A1 | 9/2013 | Wilson et al. | | |
| 2015/0142244 A1 | 5/2015 | You et al. | | |
| 2015/0242944 A1* | 8/2015 | Willard | ............ | G06Q 30/0645 705/5 |
| 2015/0285645 A1 | 10/2015 | Maise et al. | | |
| 2015/0339928 A1 | 11/2015 | Ramanujam | | |
| 2015/0348335 A1 | 12/2015 | Ramanujam | | |
| 2016/0167653 A1* | 6/2016 | Malone | ............ | B60W 10/18 701/23 |
| 2016/0247106 A1 | 8/2016 | Dalloro et al. | | |
| 2016/0264132 A1 | 9/2016 | Paul et al. | | |
| 2016/0314429 A1* | 10/2016 | Gillen | ............ | G01S 19/13 |
| 2017/0123421 A1* | 5/2017 | Kentley | ............ | G01C 21/26 |

OTHER PUBLICATIONS

International Search Report with Written Opinion for PCT/US2017/068104 dated Apr. 13, 2018, 13 pages.

* cited by examiner

*Primary Examiner* — Navid Ziaeianmehdizadeh
(74) *Attorney, Agent, or Firm* — Dority & Manning, P.A.

(57) ABSTRACT

Systems and methods for decreasing vehicle power consumption are provided. In one example embodiment, a method includes sending one or more first control signals to one or more control systems of an autonomous vehicle, the autonomous vehicle operating in a first mode and configured to provide a service to one or more users of the service. The one or more control signals cause the one or more control systems to autonomously park the vehicle at the location. The method includes sending, after the autonomous vehicle has autonomously parked at the location, one or more second control signals to the one or more control systems of the autonomous vehicle causing the autonomous vehicle to operate in a second mode, wherein the second mode requires less power than the first mode.

20 Claims, 5 Drawing Sheets

DECREASING AUTONOMOUS VEHICLE POWER CONSUMPTION

FIELD

The present disclosure relates generally to decreasing power consumption of an autonomous vehicle.

BACKGROUND

An autonomous vehicle can perceive its surroundings by using various sensor apparatuses and determining its position on the basis of the information associated with its surroundings. This can allow an autonomous vehicle to navigate without human intervention and, in some cases, even omit the use of a human driver altogether. However, the lack of in-person human oversight can potentially reduce the opportunity to decrease power consumption of the autonomous vehicle when the autonomous vehicle is not in use.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of decreasing power consumption of an autonomous vehicle. The method includes sending, by one or more computing devices, one or more first control signals to one or more control systems of an autonomous vehicle, the autonomous vehicle operating in a first mode and configured to provide a service to one or more users of the service. The one or more control signals cause the one or more control systems to autonomously park the vehicle at the location. The method includes sending, by the one or more computing devices, after the autonomous vehicle has autonomously parked at the location, one or more second control signals to the one or more control systems of the autonomous vehicle causing the autonomous vehicle to operate in a second mode, wherein the second mode requires less power than the first mode.

Another example aspect of the present disclosure is directed to a system for decreasing power consumption. The system includes one or more processors and one or more memory devices, the one or more memory devices storing instructions that when executed by the one or more processors cause the one or more processors to perform operations. The operations include sending one or more first control signals to one or more control systems of an autonomous vehicle, the autonomous vehicle operating in a first mode and configured to provide a service to one or more users of the service. The one or more control signals cause the one or more control systems to autonomously park the vehicle at a location. The operations include sending, after the autonomous vehicle has autonomously parked at the location, one or more second control signals to the one or more control systems of the autonomous vehicle causing the autonomous vehicle to operate in a second mode, wherein the second mode requires less power than the first mode.

Yet another example aspect of the present disclosure is directed to an autonomous vehicle including one or more control systems, one or more processors, and one or more memory devices. The one or more memory devices store instructions that when executed by the one or more processors cause the one or more processors to perform operations. The operations include sending one or more first control signals to the one or more control systems of the vehicle while the vehicle is operating in a first mode and configured to provide a service to one or more users of the service. The one or more control signals cause the one or more control systems to autonomously park the vehicle at a location. The operations include sending, after the vehicle has autonomously parked at the location, one or more second control signals to the one or more control systems of the vehicle causing the vehicle to operate in a second mode, wherein the second mode requires less power than the first mode Other example aspects of the present disclosure are directed to systems, methods, vehicles, apparatuses, tangible, non-transitory computer-readable media, user interfaces, and memory devices for decreasing power consumption of an autonomous vehicle.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
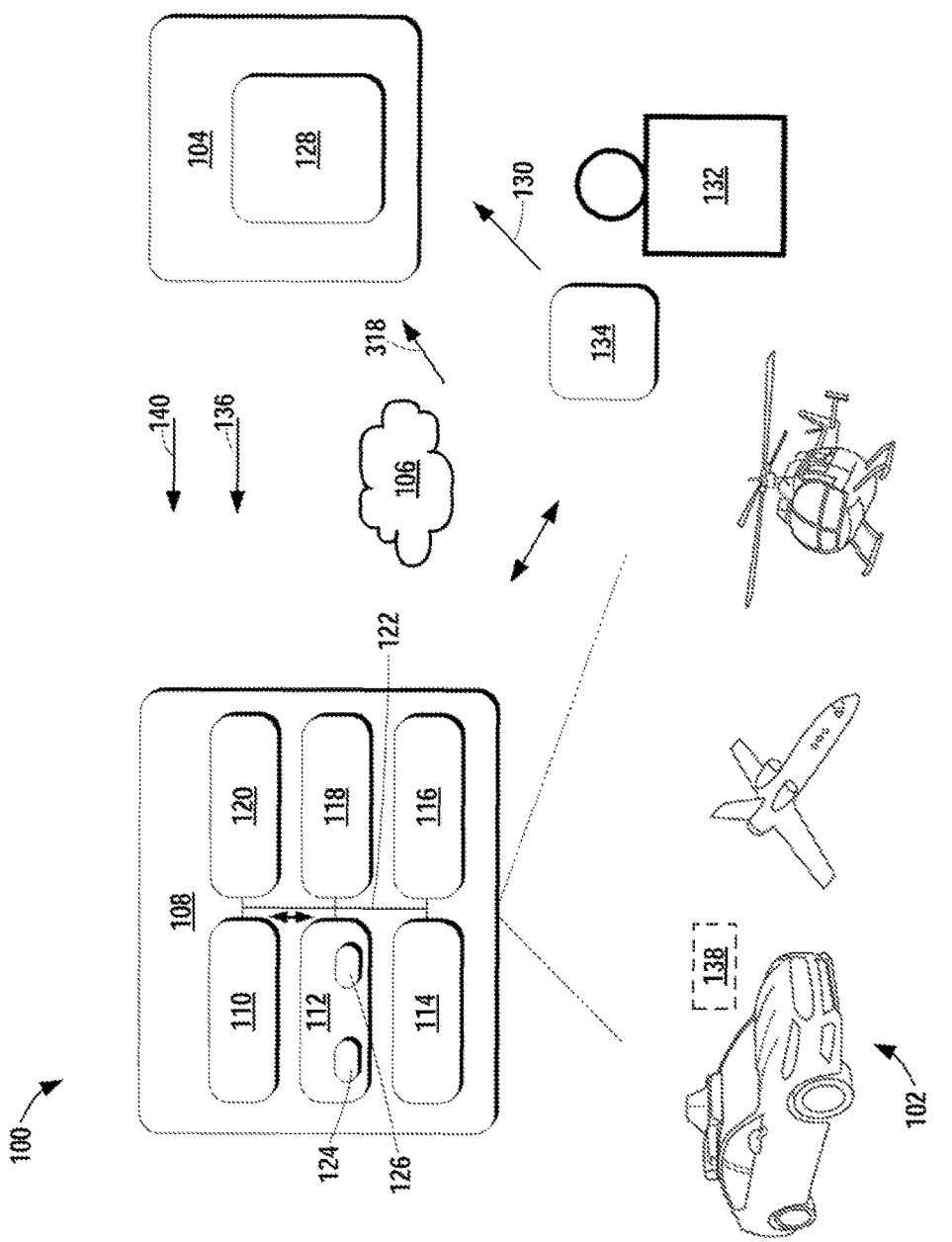
FIG. 1 depicts an example system for decreasing power consumption of an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to decreasing power consumption of an autonomous vehicle. For instance, a service provider can use a fleet of vehicles to provide a service to a plurality of users. The fleet can include, for example, autonomous vehicles that can drive, navigate, operate, etc. with minimal and/or no interaction from a human driver, as will be further described. The service provider can coordinate the autonomous vehicles to provide the services of the service provider (e.g., transportation, courier, delivery) while operating in a standard operational mode. At certain times, the autonomous vehicle can park itself and await a trip to provide services. The autonomous vehicle can operate in a lower power mode at such times. For example, while engaged in a trip, one or more systems associated with the autonomous vehicle can be operated at a level requiring more power than when the autonomous vehicle is parked and awaiting a trip. When the autonomous vehicle is parked and awaiting a trip, the one or more systems can be operated at reduced power consumption. The power consumption can be reduced to a predetermined level of consumption for at least one of the one or more systems. Prior to engaging in a trip after being parked, the one or more systems can again be operated at a level requiring more power than when the autonomous vehicle is parked and awaiting a trip.

More particularly, an autonomous vehicle can include a vehicle computing system configured to communicate with a variety of systems on-board the autonomous vehicle. When the autonomous vehicle is parked and awaiting a trip, an engine or motor system of the autonomous vehicle can be operated in a manner that requires less power consumption (e.g. fuel consumption, electric consumption, or the like). Additionally or alternatively, one or more other systems can reduce power consumption when the autonomous vehicle is parked and awaiting a trip (e.g., HVAC system, lighting system, sound system, or the like). As discussed above, the power consumption can be reduced to a predetermined level of consumption and can be reduced for the autonomous vehicle as a whole (e.g., reduction in total consumption from on-board autonomous vehicle energy storage devices, or the like) or in part (e.g., reduction in consumption from one or more individual systems). In some examples, power consumption can be reduced in a lower power mode for all vehicle systems except for a communication device (e.g., network connection, wireless receiver, camera, etc.) configured to receive control signals for transitioning between modes. In some implementations, a determination can be made as to whether the vehicle computing system and/or one or more vehicle systems are operating within predefined operating parameters prior to engaging in a trip after being parked. For instance, power consumption can be returned to standard operating levels for one or more vehicle systems and a determination can be made as to whether the one or more vehicle systems are functioning at typical (e.g., reflective of a healthy system) and/or needed operating levels for engaging in a trip. This can allow the vehicle to return to the level of power consumption needed to provide services (e.g., to travel to pick-up a user for transportation services).

In some implementations, the vehicle computing system can be configured to park the autonomous vehicle at a location that is understood to be suitable while the autonomous vehicle is awaiting a trip. To do so, the vehicle computing system can obtain data indicative of the geographic locations of one or more parking location(s). In some implementations, the vehicle computing system can select an appropriate parking location based, at least in part, on the characteristics of the parking location (e.g., size of parking location, lighting around parking location, cellular or other connectivity at parking location, cost associated with parking location, crime statistics of parking location, or the like). The vehicle computing system can determine a travel route to at least one of the parking location(s) (e.g., the most appropriate location) as well as one or more travel condition(s) associated with the travel route (e.g., traffic, weather, construction). The vehicle computing system can determine, in real-time, the requisite levels of the parameter(s) (e.g., fuel, charge level of an energy storage device, available data storage) required for the autonomous vehicle to traverse the travel route and to arrive at the selected parking location.

In some implementations, the predicted demand for services of the service provider (e.g., transportation, courier, delivery) can be utilized to determine a location to park the autonomous vehicle while the autonomous vehicle is awaiting a trip. Demand can be predicted based on anticipated demand due to an upcoming event (e.g., sporting event or the like) and/or historical demand (e.g., by approximating the amount of requesters and/or the amount of autonomous vehicles at a particular geographic region at a certain time and/or date). In some examples, demand can be determined, at least in part, by considering a total volume of vehicle service requests within one or more geographic areas at a given point in time. The system can utilize various databases to predict, approximate, and/or determine the locations and/or amount of requesters, as well as the locations and amount of available autonomous vehicles. For example, for different geographic regions, event information (e.g., location, time, and/or date of the event, or the like) can be stored in an event database. Event information can be indicative of whether service requests can be higher or lower at a certain time period (e.g., a time period before the event begins versus a time period when the event is ongoing), and can be indicative of whether there is a spike in demand for the service relative to the amount of available autonomous vehicles. In another example, calendar information that indicates important dates (e.g., holidays, first days of school for a city, voting day, or the like), can be used to determine demand. Other examples of outside sources or other stored data (e.g., predicted future, current and/or historic events, conditions, or the like) include weather conditions, news information (e.g., fires, emergency situations, or the like), social information (e.g., via social networking websites), traffic conditions, flight information from airports and/or airlines, or the like, or other information that can assist in determining supply and/or demand for the service. In some implementations, predicted demand for services of the service provider can be analyzed in real-time to provide dynamically determined control signals for shifting an autonomous vehicle between different modes.

Based on such information, parking locations can be determined that allow autonomous vehicles to be positioned to meet such demand. For example, parking locations can be determined based at least in part on a predetermined distance from a location of anticipated demand. Parking locations can additionally, or alternatively, be determined based at least in part on the aforementioned characteristics of the parking locations. Such factors, as well as other factors, can be utilized to determine a parking location.

The systems and methods described herein may provide a number of technical effects and benefits. For instance, an autonomous vehicle can park itself and await a trip to provide services while operating in a lower power mode. This can conserve power, while lowering costs (e.g., fuel consumption, electric consumption, or the like). Moreover, operating certain systems in a lower power mode can reduce wear on such systems resulting in longer working life of the vehicle and/or systems.

Another technical effect and benefit can be realized by the systems and methods described herein by using communicated control signals to shift between a standard operational mode and a lower power mode at a given vehicle. Conventional vehicles require mechanical actuation using a key, button, or other device to physically transition a vehicle between on and off states. Without requiring a physical key, the disclosed technology can start a vehicle using coordinated control signals to transition from a lower power mode to a standard operational mode, transition to desired internal vehicle conditions (e.g., comfortable temperature, operational defrost, etc.) and/or perform operational checks of vehicle systems on demand. Coordinated control signals also can be customized based on a particular type of vehicle, users of vehicle services, geographic operating areas and conditions, etc.

The systems and methods of the present disclosure also provide an improvement to autonomous vehicle parking technology. For instance, the vehicle computing system can be configured to park the autonomous vehicle at a location that is understood to be suitable while the autonomous vehicle is awaiting a trip. Such a location can be determined based on predicted demand for services associated with the autonomous vehicle. Accordingly, the systems and methods of the present disclosure can improve vehicle parking technology by improving the ability of the vehicle to be parked at a location in a lower power mode while awaiting a trip based, at least in part, on a predicted demand.

With reference now to the FIGS., example embodiments of the present disclosure will be discussed in further detail. FIG. 1 depicts an example system 100 according to example embodiments of the present disclosure. The system 100 can include a vehicle 102 and an operations computing system 104. The vehicle 102 can communicate with the operations computing system 104 via one or more communications network(s) 106. The communications network(s) 106 can include various wired and/or wireless communication mechanisms (e.g., cellular, wireless, satellite, microwave, and/or radio frequency) and/or any desired network topology (or topologies). For example, the network(s) 106 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

The vehicle 102 can be a ground-based vehicle (e.g., an automobile), an aircraft, and/or another type of vehicle. The vehicle 102 can be an autonomous vehicle that can drive, navigate, operate, etc. with minimal and/or no interaction from a human driver. The autonomous vehicle 102 can be configured to operate in one or more mode(s) such as, for example, a fully autonomous operational mode, a semi-autonomous operational mode, a park mode, a sleep mode, etc. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 waits to provide a subsequent vehicle service, recharges between operational modes, etc.

The vehicle 102 can include a vehicle computing system 108. The vehicle computing system 108 can include various components for performing various operations and functions. For example, the vehicle computing system 108 can include one or more computing device(s) on-board the vehicle 102. The computing device(s) can include one or more processor(s) and one or more memory device(s), each of which are on-board the vehicle 102. The computing device(s) can implement, include, and/or otherwise be associated with various systems on-board the vehicle 102. For instance, the vehicle computing system 108 can include one or more control system(s) 110, one or more data acquisition system(s) 112, an autonomy system 114 (e.g., including a navigation system), one or more human machine interface system(s) 116, other vehicle systems 118, and/or a communications system 120. At least a subset of the system(s) on-board the vehicle 102 can be configured to communicate with one another via a network 122. The network 122 can include one or more data bus(es) (e.g., controller area network (CAN)), on-board diagnostics connector (e.g., OBD-II), and/or a combination of wired and/or wireless communication links. The on-board systems can send and/or receive data, messages, signals, etc. amongst one another via the network 122.

The vehicle computing system 108 can cause the vehicle 102 to be operated in a manner that requires less power consumption. For example, when the vehicle 102 is parked and awaiting a trip, the vehicle computing system 108 can cause an engine or motor system of the vehicle 102 and/or one or more other systems (e.g., control system(s) 110, data acquisition system(s) 112, autonomy system(s) 114, human machine interface system(s) 116, other vehicle systems 118, and/or a communications system 120) to be operated in a manner that requires less power consumption (e.g. fuel consumption, electric consumption, or the like). The power consumption can be reduced to a predetermined level of consumption (e.g., 25%, 50%, 75%, 90%, or the like, less power consumption than in a full power mode).

The one or more control system(s) 110 of the vehicle 102 can be configured to control one or more features(s) of the vehicle 102. For example, the control system(s) 110 can be configured to control the motion of the vehicle 102 such as, for example, acceleration, speed, steering, braking, turn signals, departure, take-off, lift-off, return (e.g., landing), parking, etc. The control system(s) 110 can be configured to control one or more other feature(s) of the vehicle 102 such as the gears, status of drive, engine, HVAC system, lights, turn signals, sound system, microphone, etc. In some implementations, the control system(s) 110 can be configured to control one or more access point(s) of the vehicle 102. The access point(s) can include features such as the vehicle's door locks, trunk lock, hood lock, fuel tank access, latches, and/or other mechanical access features that can be adjusted between one or more state(s), position(s), location(s), etc. For example, the control system(s) 110 can be configured to control an access point (e.g., door lock) to adjust the access point between a first state (e.g., lock position) and a second state (e.g., unlocked position). The control system(s) 110 can also be configured to receive control signals that are indicative of the parameter(s) at which the features and/or access points of the vehicle 102 are to operate.

The data acquisition systems 112 can include various devices configured to acquire data associated with the vehicle 102. This can include data associated with one or more of the vehicle's system(s) (e.g., health data), the vehicle's interior, the vehicle's exterior, the vehicle's surroundings, the vehicle users, etc. The data acquisition systems 112 can include, for example, one or more image capture device(s) 124. The image capture device(s) 124 can include one or more camera(s), light detection and ranging (or radar) device(s) (LIDAR systems), two-dimensional image capture devices, three-dimensional image capture devices, static image capture devices, dynamic (e.g., rotating) image capture devices, video capture devices (e.g., video recorders), lane detectors, scanners, optical readers, electric eyes, and/or other suitable types of image capture devices. The image capture device(s) 124 can be located in the interior and/or on the exterior of the vehicle 102. The one or more image capture device(s) 124 can be configured to acquire image data to be used for operation of the vehicle 102 in an autonomous mode. For example, the image capture device(s) 124 can acquire image data to allow the vehicle 102 to implement one or more machine vision technique(s) (e.g., to detect objects in the surrounding environment).

Additionally, or alternatively, the data acquisition systems 112 can include one or more sensor(s) 126. The sensor(s) 126 can include impact sensors, motion sensors, pressure sensors, temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data indicative of parameter(s) associated with the vehicle 102 and/or relevant to the operation of the vehicle 102. The data acquisition systems 112 can include one or more sensor(s) 126 dedicated to obtaining data associated with a particular aspect of the vehicle 102, such as, the vehicle's fuel tank, engine, oil compartment, wipers, etc. The sensor(s) 126 can also, or alternatively, include sensor(s) associated with one or more mechanical and/or electrical components of the vehicle 102. For example, one or more of the sensor(s) 126 can be configured to detect whether a vehicle door, trunk, gas cap, etc. is in an open or closed position. In some implementations, the data acquired by the sensor(s) 126 can help detect other vehicles and/or objects, road conditions (e.g., curves, potholes, dips, bumps, changes in grade), measure a distance between the vehicle 102 and the other vehicles and/or objects, etc.

The vehicle computing system 108 can also be configured to obtain map data. For instance, a computing device of the vehicle 102 (e.g., within the autonomy system 114) can be configured to receive map data from one or more remote computing device(s). This can include computing device(s) of the operations computing system 104 and/or one or more other remote computing device(s) (e.g., associated with a geographic mapping service provider). The map data can include two-dimensional and/or three-dimensional geographic map data associated with the area in which the vehicle was, is, intends to, and/or will be travelling. The data acquired from the data acquisition system(s) 112, the map data, and/or other data can be stored in one or more memory device(s) on-board the vehicle 102.

The autonomy system 114 can be configured to allow the vehicle 102 to operate in an autonomous mode. For instance, the autonomy system 114 can obtain the data associated with the vehicle 102 (e.g., acquired by the data acquisition systems 112). The autonomy system 114 can also obtain the map data. The autonomy system 114 can control various functions of the vehicle 102 based, at least in part, on the acquired data associated with the vehicle 102 and/or the map data to implement the autonomous mode. For example, the autonomy system 114 can include various models to perceive road features, signage, and/or objects, people, animals, etc. based, at least in part, on the data acquired by the data acquisition system(s) 112, map data, and/or other data. In some implementations, the autonomy system 114 can include machine-learned models that use the data acquired by the data acquisition system(s) 112, the map data, and/or other data to help operate the autonomous vehicle. Moreover, the acquired data can help detect other vehicles and/or objects, road conditions (e.g., curves, potholes, dips, bumps, changes in grade, or the like), measure a distance between the vehicle 102 and other vehicles or objects, etc. The autonomy system 114 can be configured to predict the position and/or movement (or lack thereof) of such elements (e.g., using one or more odometry techniques). The autonomy system 114 can be configured to plan the motion of the vehicle 102 based, at least in part, on such predictions. The autonomy system 114 can implement the planned motion to appropriately navigate the vehicle 102 with minimal or no human intervention. For instance, the autonomy system 114 can include a navigation system configured to direct the vehicle 102 to a destination location. The autonomy system 114 can send signals to the control system(s) 110 to regulate vehicle speed, acceleration, deceleration, steering, and/or operation of other components to operate in an autonomous mode to travel to such a destination location.

The autonomy system 114 can send signals to the control system(s) 110 to park the vehicle 102 at a location that is understood to be suitable while the vehicle 102 is awaiting a trip. The autonomy system 114 can select an appropriate parking location based, at least in part, on the characteristics of the parking location (e.g., size of parking location, lighting around parking location, cellular or other connectivity at parking location, cost associated with parking location, crime statistics of parking location, or the like). The autonomy system 114 can determine a travel route to at least one of the parking location(s) (e.g., the most appropriate location) as well as one or more travel condition(s) associated with the travel route (e.g., traffic, weather, construction).

Figure 2:
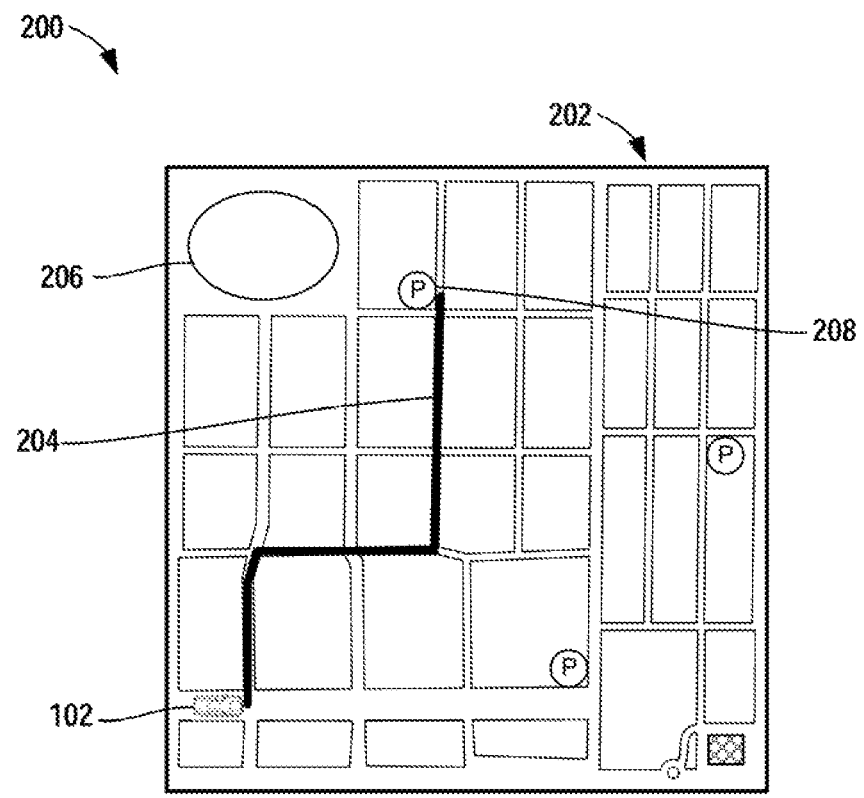
FIG. 2 depicts an example graphical representation of a plurality of parking locations according to example embodiments of the present disclosure.

FIG. 2 illustrates a graphical representation 200 of the vehicle 102 in a geographic area 202 according to example embodiments of the present disclosure. The predicted demand can be utilized by the vehicle computing system 108 to determine a location to park the vehicle 102 while the vehicle is awaiting a trip. For example, demand can be predicted by the vehicle computing system 108 based on anticipated demand due to an event at location 206. Based at least in part on such anticipated demand, autonomy system 114 can generate a route 204 to parking location 208 and vehicle 102 can be positioned at parking location 208 to meet such demand.

Figure 3:
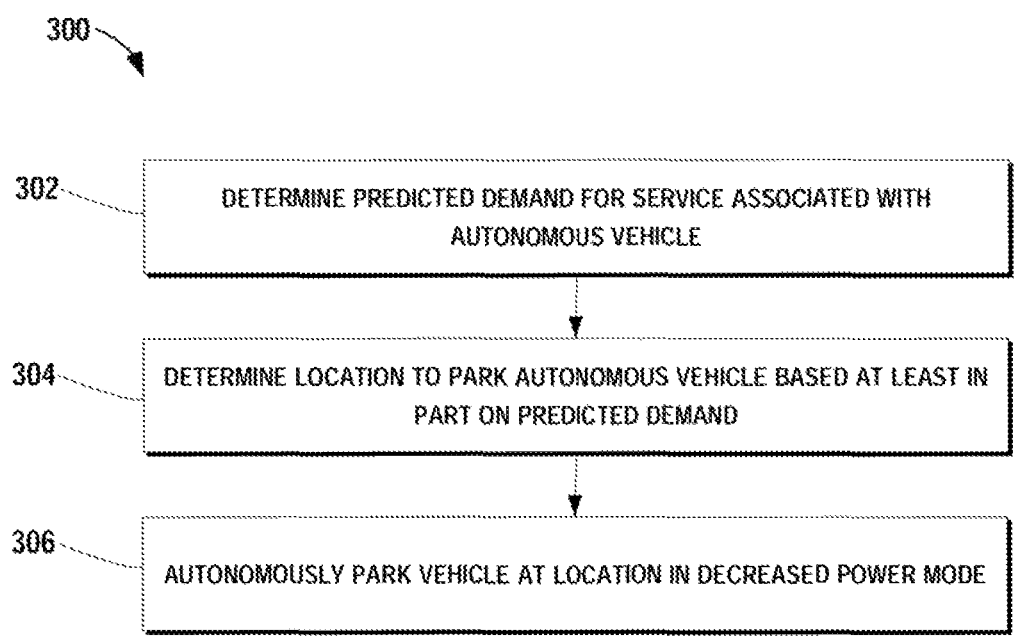
FIG. 3 depicts a flow diagram of an example method of determining a parking location for an autonomous vehicle according to example embodiments of the present disclosure.

FIG. 3 depicts a flow diagram of an example method 300 of parking an autonomous vehicle at a suitable location while awaiting a trip according to example embodiments of the present disclosure. One or more portion(s) of the method 300 can be implemented by one or more computing device(s) such as, for example, the vehicle computing system 108 shown in FIGS. 1 and 5. Moreover, one or more portion(s) of the method 300 can be implemented as an algorithm on the hardware components of the device(s) described herein (e.g., as in FIGS. 1 and 5) to, for example, park an autonomous vehicle at a suitable location. FIG. 3 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. In some implementations, one or more portions of method 300 can be performed by the operations computing system 104.

At (302), the method 300 can include determining predicted demand for a service associated with a vehicle. For instance, the operations computing system 104 and/or the vehicle computing system 108 (e.g., the associated computing devices) can determine a predicted demand for the service (e.g., transportation, delivery, courier) at one or more geographic areas (e.g., the geographic area 202). In some implementations, the operations computing system 104 and/or the vehicle computing system 108 can determine the predicted demand for the service at one or more areas (e.g., within the geographic area 202) based at least in part on anticipated demand for the service due to an upcoming event. By way of example, the operations computing system 104 and/or the vehicle computing system 108 can determine the predicted demand for a service (e.g., transportation service) at or near an event location 206 (e.g., stadium, arena) when an event (e.g., sporting event, concert) is to take place. Additionally, and/or alternatively, the operations computing system 104 and/or the vehicle computing system 108 can predict demand for the service at one or more areas based at least in part on historical demand for the service. For example, the operations computing system 104 and/or the vehicle computing system 108 can approximate the amount of service requesters (e.g., users) that may be associated with a particular location (e.g., event location 206) at a certain time and/or day based at least in part on historical data that is indicative of the amount of service requesters at a similar time and/or day for the area. In some examples, demand can be determined, at least in part, by considering a total volume of vehicle service requests within one or more geographic areas at a given point in time.

The operations computing system 104 and/or the vehicle computing system 108 can utilize various databases to predict, approximate, and/or determine the locations and/or amount of requesters, as well as the locations and amount of available autonomous vehicles. For example, for different geographic regions, event information (e.g., location, time, and/or date of the event, or the like) can be stored in an event database. Event information can be indicative of whether service requests can be higher or lower at a certain time period (e.g., a time period before the event begins versus a time period when the event is ongoing), and can be indicative of whether there is a spike in demand for the service relative to the amount of available vehicles. In another example, calendar information that indicates important dates (e.g., holidays, first days of school for a city, voting day, or the like), can be used to determine demand. Other examples of outside sources or other stored data (e.g., predicted future, current and/or historic events, conditions, or the like) include weather conditions, news information (e.g., fires, emergency situations, or the like), social information (e.g., via social networking websites), traffic conditions, flight information from airports and/or airlines, or the like, or other information that can assist in determining supply and/or demand for the service. In some implementations, predicted demand for services of the service provider can be analyzed by the operations computing system 104 and/or the vehicle computing system 108 in real-time and/or near real-time.

At (304), the method 300 can include determining a location to park the vehicle based at least in part on predicted demand. For instance, the operations computing system 104 and/or the vehicle computing system 108 can determine a location 208 to park the vehicle 102 based at least in part on the predicted demand. The operations computing system 104 and/or the vehicle computing system 108 can obtain data indicative of the geographic locations of one or more parking location(s). The operations computing system 104 and/or the vehicle computing system 108 can select an appropriate parking location (e.g., the parking location 208) based, at least in part, on the predicted demand. By way of example, the predicted demand can indicate that the volume of requesters (users) and/or service requests is anticipated to be and/or is historically high at a particular time near location 206 (e.g., an event location). As such, the operations computing system 104 and/or the vehicle computing system 108 can select the parking location 208 that is approximate to the location 206 such that the vehicle 102 is conveniently located to meet the predicted demand (e.g., the high volume of potential service requests).

In some examples, the operations computing system 104 and/or the vehicle computing system 108 can determine a route 204 to the parking location 208. For instance, the operations computing system 104 and/or the vehicle computing system 108 can determine the route 204 to the parking location 208 based at least in part on the predicted demand. By way of example, the event location 206 may have one or more road closures and/or congested areas near the event location during an event. As such, the operations computing system 104 and/or the vehicle computing system 108 can determine that the vehicle 102 should travel to the parking location 208 along a travelway (e.g., street, road) that does not lead directly into the event location 206. In this way, the vehicle 102 can increase the likelihood that it will arrive at the parking location (e.g., in a timely manner) in order to meet the predicted demand.

In some examples, the operations computing system 104 and/or the vehicle computing system 108 can consider the amount of available autonomous vehicles (e.g., that may be within a geographic area) when considering where to park the vehicle 102. For example, the operations computing system 104 and/or the vehicle computing system 108 can obtain data indicative of the location of other available vehicles (e.g., associated with the service provider) that may be available to respond to one or more service requests. In the event that the supply of other available vehicles is low in an area with high predicted demand (e.g., event location 206), the operations computing system 104 and/or the vehicle computing system 108 can select the parking location 208 as a location for the vehicle 102 to park. In this way, the operations computing system 104 and/or the vehicle computing system 108 can also, or alternatively, determine a location 208 to park the vehicle 102 based at least in part on the predicted vehicle supply associated with one or more areas (e.g., around event location 206).

At (306), the method 300 can include autonomously parking a vehicle at the determined location. For instance, the operations computing system 104 and/or the vehicle computing system 108 can send one or more signals to cause the vehicle 102 to autonomously park at the location 208. By way of example, the operations computing system 104 can send one or more signals to the vehicle computing system 108 indicating that the vehicle 102 is to park at the location 208 (e.g., near the event location 206). The vehicle computing system 108 can receive such signals and can cause the vehicle 102 to travel to the location 208 (e.g., via autonomous navigation). The vehicle computing system 108 can acquire data associated with the parking location (e.g., via the data acquisitions systems 112). The data associated with the parking location can include size, shape, orientation (e.g., parallel, head-on), position (e.g., street-side, parking garage), and/or other characteristics of the parking location 208. The vehicle computing system 108 (e.g., the autonomy system 114) can plan a motion of the vehicle 102 such that the vehicle 102 is capable of reaching a parked position at the parking location 208. For example, the vehicle computing system 108 can determine the turn angle, direction, speed, position, orientation, timing, etc. that are needed for the vehicle 102 to reach the parked position. The vehicle computing system 108 can send one or more control signals to the one or more control systems (e.g., 110) of the vehicle 102 indicative of the planned motion. The one or more first control signals can cause the one or more control systems (e.g., 110) to autonomously park the vehicle 102 at a location 208. Accordingly, the control systems can implement the planned motion such that the vehicle 102 can autonomously park at the parking location 208 in an appropriate manner. In some implementations, the vehicle 102 can be parked such that a heading of the vehicle 102 is position in the general direction of a location associated with the predicted demand (e.g., the event location 206, a location of predicted high volume service requests, predicted high volume of requesters). The parked vehicle 102 can be autonomously placed in a decreased power mode while parked.

Returning again to FIG. 1, the human machine interface system(s) 116 can be configured to allow interaction between a user (e.g., human), the vehicle 102 (e.g., the vehicle computing system 108), and/or a third party (e.g., an operator associated with the service provider). The human machine interface system(s) 116 can include a variety of interfaces for the user to input and/or receive information from the vehicle computing system 108. For example, the human machine interface system(s) 116 can include a graphical user interface, direct manipulation interface, web-based user interface, touch user interface, attentive user interface, conversational and/or voice interfaces (e.g., via text messages, chatter robot), conversational interface agent, interactive voice response (IVR) system, gesture interface, and/or other types of interfaces. The human machine interface system(s) 116 can include one or more input device(s) (e.g., touchscreens, keypad, touchpad, knobs, buttons, sliders, switches, mouse, gyroscope, microphone, other hardware interfaces) configured to receive user input. The human machine interface(s) 116 can also include one or more output device(s) (e.g., display devices, speakers, lights) to receive and output data associated with the interfaces. The human-machine interface systems can include and/or be associated with one or more user device(s) of the vehicle 102 (e.g., a tablet within the interior of the vehicle 102 that is connected to the vehicle 102).

The other vehicle systems 118 can be configured to control and/or monitor other aspects of the vehicle 102. For instance, the other vehicle systems 118 can include software update monitors, an engine control unit, transmission control unit, the on-board memory devices, etc. By way of example, the software update monitors can provide data indicative of a current status of the software running on one or more of the on-board systems and/or whether the respective system requires a software update.

The communications system 120 can be configured to allow the vehicle computing system 108 (and its subsystems) to communicate with other computing devices. In some implementations, the vehicle computing system 108 can use the communications system 120 to communicate with one or more remote computing device(s) that are remote from the vehicle 102, such as those of the operations computing system 104 (e.g., over the network(s) 106 via wireless connections). The communications system 120 can include any suitable components for interfacing with one or more network(s), including for example, transmitters, receivers, ports, controllers, antennas, or other suitable components that can help facilitate communication with one or more computing device(s).

The operations computing system 104 can be associated with a service provider that provides one or more vehicle service(s) to a plurality of users via a fleet of vehicles that includes, for example, the vehicle 102. The service provider can be an entity that organizes, coordinates, manages, etc. one or more vehicle service(s) for users. The vehicle service(s) can include transportation services (e.g., rideshare services), courier services, delivery services, and/or other types of services. The vehicle 102 (and others in the fleet) can be configured to provide the vehicle service(s) to the users. A user can be a user that has downloaded a software application associated with the service provider, a user that has made a service request with the service provider, a user that is a customer of the service provider, a user that has registered with (e.g., signed-up with, has an account with, has a profile with, has subscribed to) the service provider, a current user of the vehicle, a potential user of the vehicle, a user that has been paired with the vehicle, etc. The service provider can coordinate a plurality of vehicles, including the vehicle 102, to provide the vehicle service(s) to a plurality of users. Such coordination can be performed via the operations computing system 104.

The operations computing system 104 can include multiple components for performing various operations and functions. For example, the operations computing system 104 can include and/or otherwise be associated with one or more computing device(s) 128 that are remote from the vehicle 102. The one or more computing device(s) 128 can include one or more processor(s) and one or more memory device(s). The one or more memory device(s) can store instructions that when executed by the one or more processor(s) cause the one or more processor(s) to perform operations and functions, such as those for addressing a user-reported vehicle condition. For example, the computing device(s) 128 can be configured to monitor and communicate with the vehicle 102 and/or its users to coordinate a vehicle service provided by the vehicle 102.

The computing device(s) 128 can receive a service request 130 for a vehicle service. For example, a user 132 can operate a user device 134 to generate and transmit a service request 130 (e.g., for transportation services) to the computing device(s) 128. In some implementations, the user device 134 can include a software application associated with the service provider via which the user 132 can provide the service request 130 for a vehicle service. In some implementations, the user 132 can interact with a user interface provided by the software application to specify a service type, a vehicle type, one or more location(s) (e.g., origin, destination), etc. and select one or more element(s) to cause the software application to generate and transmit the service request 130.

The service request 130 can include a variety of information associated with the user 132, the requested vehicle service, and/or the vehicle. For instance, the service request 130 can be indicative of the user 132 associated with the service request 130. By way of example, the service request 130 can include an ID associated with an account and/or profile of the user 132 and/or the user device 134 associated with the user 132 (e.g., a user name, user ID, a hash of the user name and/or user ID, an ID corresponding to the user device). The service request 130 can also be indicative of one or more location(s). For example, the service request 130 can be indicative of an origin location (e.g., pick-up location for transport, courier), a destination location, a delivery location, etc. The service request 130 can be indicative of a location associated with the user 132 (e.g., that provided the service request 130 via the user device 134). A location can be indicated as a location data point (e.g., such as a latitude and a longitude), a semantic location (e.g., "City A Natural History Museum"), and/or another type of identifier. For example, a pick-up location can correspond to a current location of the user device 134 that is determined by a global positioning system (GPS) resource of the user device 134. The user device 134 (and/or a software application) can receive the current location and include the current location as a location in the service request 130. The service request 130 can also include other information such as a service type (e.g., indicating the type of vehicle service being requested), a vehicle type information (e.g., indicating what type of vehicle is preferred), and/or a payment identifier (e.g., associated with a user account and/or profile).

The computing device(s) 128 of the operation computing system can identify a vehicle to provide the vehicle service requested by the service request 130. To do so, the computing device(s) 128 can manage a service queue to provide the user 132 with one or more vehicle service(s) of the service provider. Additionally, or alternatively, the computing device(s) 128 can match a vehicle (e.g., 102) to a service request 130 based on one or more characteristics associated with the vehicle such as, for example, the location of the vehicle, the type of vehicle, a status of the vehicle, etc.

The computing device(s) 128 of the operations computing system 104 can instruct the vehicle 102 to provide the requested vehicle services. For instance, the computing device(s) 128 can send one or more control signal(s) 136 to the vehicle 102 indicating that the vehicle 102 is to travel to a location (e.g., indicated in the service request 130, associated with the user 132). The control signal(s) 136 can be provided to the vehicle 102 via one or more of the network(s) 106. The control signal(s) 136 can indicate one or more of a location to which the vehicle 102 is to travel (e.g., the location of the user), the type of vehicle service to be provided, a destination location (e.g., to where the user 132 is to be transported), etc. The vehicle computing system 108 can receive the control signal(s) 136 (e.g., via the communication system(s) 120). The vehicle computing system 108 can process the control signal(s) 136 to determine what the vehicle 102 is to do in response thereto. The vehicle computing system 108 can then cause the vehicle 102 to act in accordance with the control signal(s) 136. For example, the autonomy system 114 and/or the control systems 110 can cause the vehicle 102 to travel to a location associated with the user 132 (and/or indicated in the service request 130) to provide the vehicle services to the user (e.g., pick-up the user for transportation).

The computing device(s) 128 of the operations computing system 104 can also cause the vehicle 102 to be operated in a manner that requires less power consumption. For example, when the vehicle 102 is parked and awaiting a trip, the computing device(s) 128 can cause an engine or motor system of the vehicle 102 and/or one or more other systems (e.g., control system(s) 110, data acquisition system(s) 112, autonomy system(s) 114, human machine interface system(s) 116, other vehicle systems 118, and/or a communications system 120) to be operated in a manner that requires less power consumption (e.g. fuel consumption, electric consumption, or the like). A determination can be made by the operations computing system 104 and/or vehicle computing system 108 as to whether the vehicle computing system 108 and/or one or more vehicle systems (e.g., control system(s) 110, data acquisition system(s) 112, autonomy system(s) 114, human machine interface system(s) 116, other vehicle systems 118, and/or a communications system 120) are operating within predefined operating parameters prior to engaging in a trip after being parked. Communication 318 indicative of the existence of a condition 138 (e.g., adverse condition) associated with the vehicle 102 which causes the vehicle to operate outside of predefined operating parameters can be provided to the operations computing system 104 to determine one or more action(s) to be performed by the vehicle 102 based, at least in part, on the condition 138 associated with the vehicle 102. At least some of the action(s) can attempt to alleviate the condition 138 so that the vehicle can return to normal operating parameters prior to engaging in a trip (e.g., run diagnostic). The computing device(s) 128 can be configured to send one or more control signal(s) 140 to the vehicle 102 to perform one or more of the action(s).

Figure 4:
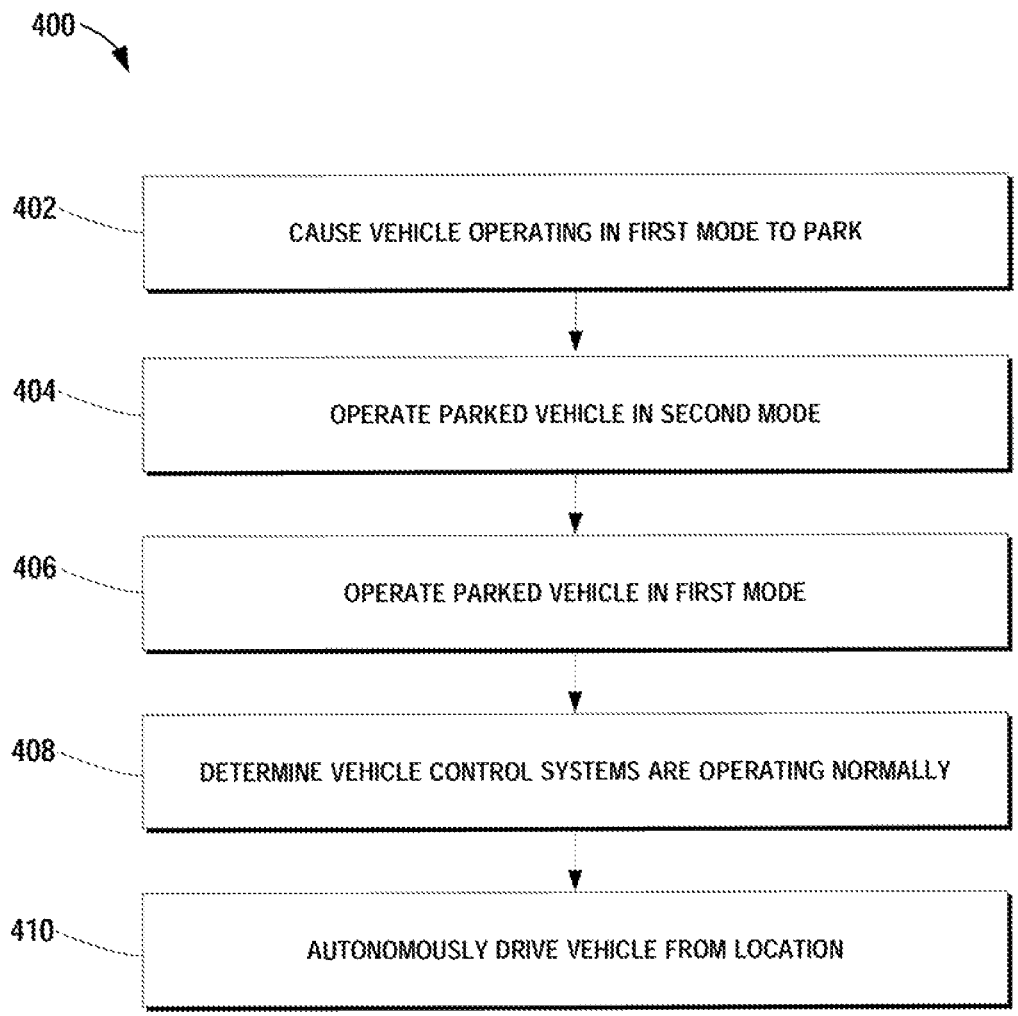
FIG. 4 depicts a flow diagram of an example method of decreasing power consumption of an autonomous vehicle according to example embodiments of the present disclosure.

FIG. 4 depicts a flow diagram of an example method 400 of causing a vehicle 102 to be operated in a manner that requires less power consumption according to example embodiments of the present disclosure. One or more portion(s) of the method 400 can be implemented by one or more computing device(s) such as, for example, the computing device(s) 128 and/or vehicle computing system 108 shown in FIGS. 1 and 5. Moreover, one or more portion(s) of the method 400 can be implemented as an algorithm on the hardware components of the device(s) described herein (e.g., as in FIGS. 1 and 5) to, for example, decrease vehicle power consumption. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. While portions of the method 400 are described below as being performed by computing device(s) of the vehicle computing system 108, the computing device(s) of the operations computing system 104 can also or alternatively perform one or more portions of method 400.

At (402), the method 400 can include causing a vehicle operating in a first mode to park at a location. The vehicle 102 can initially operate in a first mode and can be configured to provide a service to one or more users of a service. The vehicle computing system 108 can cause the vehicle 102 to be operated in a manner (e.g., first mode) that requires normal power consumption. For example, while engaged in a trip, one or more systems associated with the vehicle 102 can be operated at a level requiring more power than when the vehicle 102 is parked and awaiting a trip. While in the first mode the vehicle 102 can operate at standard operating levels for one or more vehicle systems that are typical, reflective, indicative, etc. of a healthy system and/or needed operating levels for providing a service (e.g., engaging in a trip). For instance, when the vehicle 102 is operating in the first mode the vehicle 102 can consume the power, charge, energy, fuel, bandwidth, data storage, etc. that is necessary for the vehicle computing system 108 to autonomously navigate the vehicle 102 (e.g., to provide a transportation, courier, delivery, other service). One or more computing device(s) of the vehicle computing system 108 (e.g., the autonomy system 114) can send one or more first control signals to one or more systems (e.g., control systems 110) of the vehicle 102. The one or more control signals can cause the one or more control systems to autonomously park the vehicle 102 at a location (e.g., 208), as described herein.

At (404), the method 400 can include operating a parked vehicle in a second mode. For instance, the computing devices of the vehicle computing system 108 can send (e.g., after the vehicle has autonomously parked at the location) one or more second control signals to the one or more control systems of the vehicle 102 causing the vehicle 102 to operate in a second mode. The second mode can require less power than the first mode. For example, the vehicle computing system 108 may expend an increase level of power while in the first mode (e.g., to autonomously navigating the vehicle 102). However, when the vehicle 102 is parked (e.g., awaiting to provide a service), the second control signals can cause one or more control systems to adjust an engine or motor system of the vehicle 102 to be operated in a manner that requires less power consumption (e.g. fuel consumption, electric consumption, or the like). Additionally or alternatively, one or more other systems can reduce power consumption when the autonomous vehicle is parked and awaiting a trip (e.g., HVAC system, lighting system, sound system, autonomy system, data acquisition system, or the like). In some implementations, the vehicle systems that operate in a reduced power mode can be based at least in part on a priority of the systems, such that systems deemed less critical to the parked vehicle (e.g., the human machine interface systems) are the first to begin to operate in a reduced power, then the systems that are deemed more critical for vehicle operation (e.g., communication system).

The power consumption can be reduced to a predetermined level of consumption and can be reduced for the vehicle 102 as a whole (e.g., reduction in total consumption from on-board vehicle energy storage devices, or the like) or in part (e.g., reduction in consumption from one or more individual systems such as the energy consumed in data processing, data storage). In some examples, power consumption can be reduced in a lower power mode for all vehicle systems except for a communication device (e.g., network connection, wireless receiver, camera, etc.) configured to receive control signals for transitioning between modes. The power consumption of the vehicle can be at least 50 percent less in the second mode as compared to the first mode (e.g., 50% less consumption by the aggregate of the vehicle systems operating in reduced power mode, 50% for each system operating in reduced power mode). In some implementations, the power consumption of the vehicle 102 can be at least 75 percent less in the second mode as compared to the first mode.

At (406), the method 600 can include operating the vehicle in the first mode. For example, the operations computing system 104 can receive a service request 130 for a service (e.g., transportation service). As such, the operations computing system 104 can provide a signal to the vehicle 102 indicative of the service request. The vehicle computing system 108 can send (e.g., after the vehicle 102 has operated in a second mode) one or more third control signals to one or more control systems of the vehicle 102 to cause the vehicle 102 to operate in the first mode. As described herein, when the vehicle 102 is parked and awaiting a trip, the vehicle computing system 108 can cause an engine or motor system of the vehicle 102 and/or one or more other systems (e.g., control system(s) 110, data acquisition system(s) 112, autonomy system(s) 114, human machine interface system(s) 116, other vehicle systems 118, and/or a communications system 120) to be operated in a manner that requires less power consumption (e.g. fuel consumption, electric consumption, or the like). However, the vehicle 102 can be returned to the first mode so that the vehicle 102 can provide a service (e.g., transportation service) to a user (e.g., rider).

In some implementations, at (408), the method 400 can include determining vehicle control systems are operating normally. The vehicle computing system 108 (and/or the operations computing system 104) can determine whether the vehicle computing system 108 and/or one or more vehicle systems (e.g., control system(s) 110, data acquisition system(s) 112, autonomy system(s) 114, human machine interface system(s) 116, other vehicle systems 118, and/or a communications system 120) are operating within predefined operating parameters prior to engaging in service (e.g., in a trip), after being parked. The predefined operating parameters can be indicative of the standard, healthy, minimum necessary, etc. operating levels for one or more vehicle systems. This can allow the vehicle 102 to return to the level of power consumption needed to provide services (e.g., to travel to pick-up a user for transportation services).

At (410), the method 600 can include autonomously driving from a location. For instance, the vehicle computing system 108 can provide one or more control signals to the one or more control systems of the vehicle 102 to cause the vehicle 102 to travel (e.g., autonomously drive) from the location (e.g., parking location 208).

Figure 5:
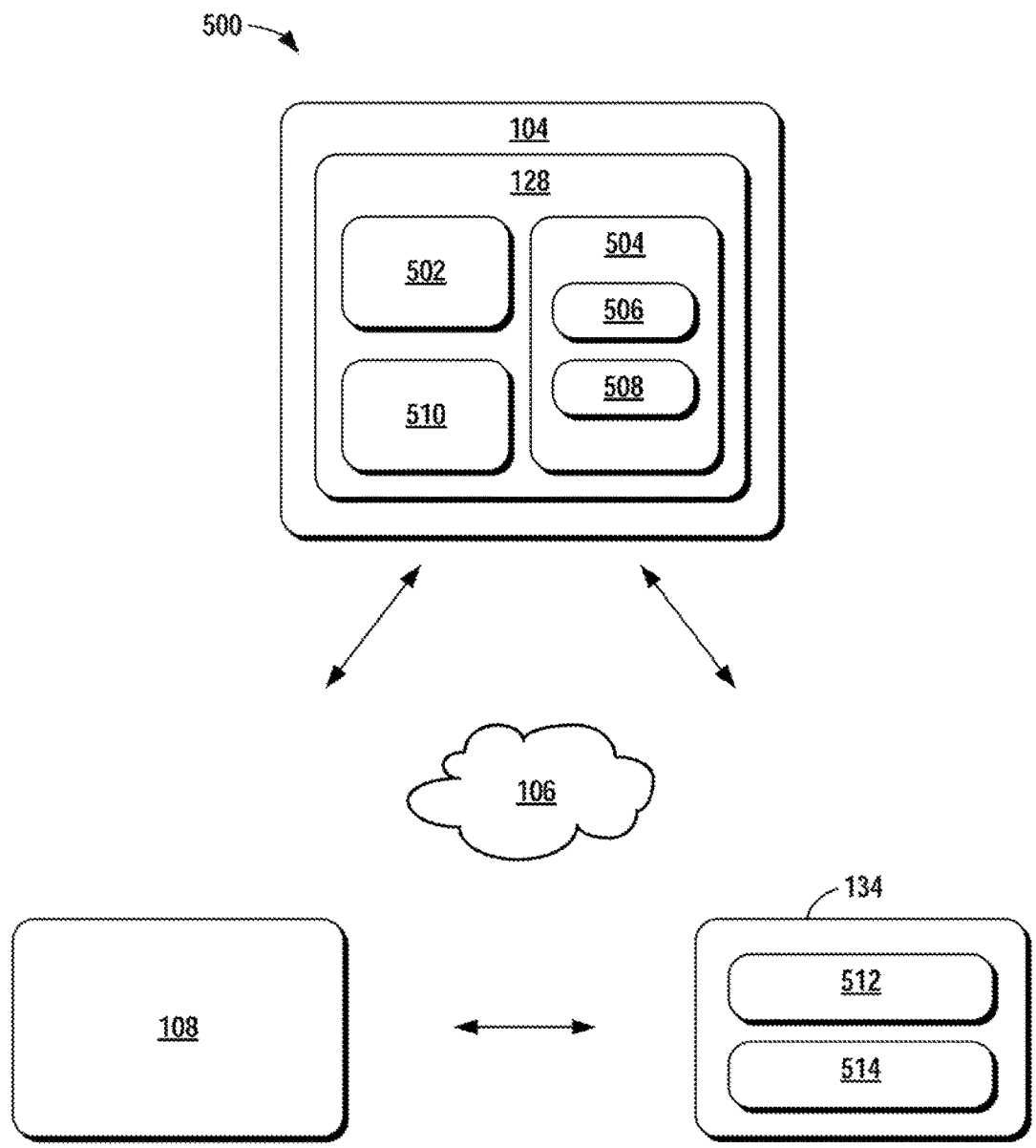
FIG. 5 depicts an example system according to example embodiments of the present disclosure.

FIG. 5 depicts an example system 500 according to example embodiments of the present disclosure. The system 500 can include the operations computing system 104, the vehicle computing system 108 (e.g., located on-board the vehicle 102), and one or more user device(s) 134. The operations computing system 104, the vehicle computing system 108, and one or more user device(s) 134 can be configured to communicate via the one or more network(s) 106 such as those as described herein.

The operations computing system 104 can include the one or more computing device(s) 128. The computing device(s) 128 can include one or more processor(s) 502 and one or more memory device(s) 504. The one or more processor(s) 502 can be any suitable processing device such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), processing units performing other specialized calculations, etc. The processor(s) can be a single processor or a plurality of processors that are operatively and/or selectively connected. The memory device(s) 504 can include one or more non-transitory computer-readable storage media (e.g., storing computer-readable instructions), such as RAM, ROM, EEPROM, EPROM, flash memory devices, magnetic disks, etc., and/or combinations thereof.

The memory device(s) 504 can store information that can be accessed by the one or more processor(s) 502. For instance, the memory device(s) 504 can include computer-readable instructions 506 that can be executed by the one or more processor(s) 502. The instructions 506 can be software written in any suitable programming language or can be implemented in hardware. Additionally, or alternatively, the instructions 506 can be executed in logically and/or virtually separate threads on processor(s) 502. The instructions 506 can be any set of instructions that when executed by the one or more processor(s) 502 cause the one or more processor(s) 502 to perform operations.

For example, the memory device(s) 504 can store instructions 506 that when executed by the one or more processor(s) 502 cause the one or more processor(s) 502 to perform operations such as any of the operations and functions of the computing device(s) 128 or for which the computing device(s) 128 are configured, as described herein, the operations for decreasing vehicle power consumption (e.g., one or more portion(s) of method 400), and/or any other operations or functions for suitably parking a vehicle, as described herein.

The one or more memory device(s) 504 can store data 508 that can be retrieved, manipulated, created, and/or stored by the one or more processor(s) 502. The data 508 can include, for instance, data associated with the fleet of vehicles of the service provider, data associated with one or more service request(s), data associated with a volume of service requests, data associated with one or more user(s), data associated with locations (e.g., of vehicles, users), data associated with control signals, data associated with actions to be performed by a vehicle, data associated with parking locations, data associated with power consumption of a vehicle, data indicative of user input, data acquired by a system on-board a vehicle and/or a user device, and/or other data or information. The data 508 can be stored in one or more database(s). The one or more database(s) can be split up so that they are located in multiple locales. In some implementations, the computing device(s) 128 can obtain data from one or more memory device(s) that are remote from the computing device(s) 128.

The computing device(s) 128 can also include communication interface 510 used to communicate with the vehicle computing system 108 and/or the user device(s) 134 (e.g., over the network(s) 106). The communication interface 510 can include any suitable components for interfacing with one or more network(s), including for example, transmitters, receivers, ports, controllers, antennas, or other suitable hardware and/or software.

The user device(s) 134 can be various types of computing devices. For example, the user device(s) 134 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The user device(s) 134 can be associated with a user (e.g., 132). The user device(s) 134 can be associated with a vehicle (e.g., 102). For example, the user device(s) 134 described herein can also be representative of a user device that can be included in the human machine interface system of the vehicle 102 (e.g., a user device connected to the vehicle computing system 108).

The user device 134 can also include one or more input device(s) 512 and/or one or more output device(s) 514. In the event that the user device 134 is associated with a vehicle, the input device(s) 512 and/or the output device(s) 514 can be included and/or otherwise associated with one or more human-machine interface system(s) of the vehicle. The input devices 512 can include, for example, hardware for receiving information from a user, such as a touch screen, touch pad, mouse, data entry keys, speakers, a microphone suitable for voice recognition, imaging devices and/or sensors for gesture recognition technology, etc. The output device(s) 514 can include one or more display device(s) (e.g., display screen, CRT, LCD) and/or one or more audio output device(s) (e.g., speakers). The display device(s) and/or the audio output device(s) can be used to facilitate communication with a user. For example, a human operator (e.g., associated with a service provider) can communicate with a current user of a vehicle via at least one of the display device(s) and the audio output device(s).

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing device(s) remote from the vehicle (e.g., the operations computing system and its associated computing device(s)) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of decreasing power consumption of an autonomous vehicle, comprising:

determining, by a first computing system, a predicted demand for a service at one or more geographic areas, wherein the service is provided by an autonomous vehicle to one or more users of the service, wherein the predicted demand is determined based, at least in part, on historical demand for the service at the one or more geographic areas;

autonomously determining, by a second computing system on-board the autonomous vehicle, a location to park the autonomous vehicle based at least in part on the predicted demand, cellular connectivity at the location to park, and the location to park being within a predetermined distance from the one or more geographic areas;

sending, by the second computing system on-board the autonomous vehicle, one or more first control signals to one or more control systems of the autonomous vehicle, the autonomous vehicle operating in a first mode, wherein the one or more first control signals cause the one or more control systems to autonomously park the vehicle at the location; and sending, by the second computing system on-board the autonomous vehicle, after the autonomous vehicle has autonomously parked at the location, one or more second control signals to the one or more control systems of the autonomous vehicle causing the autonomous vehicle to autonomously operate in a second mode, wherein the second mode requires less power than the first mode and reduces power to one or more vehicle systems of the autonomous vehicle based at least in part on a priority of each of the one or more vehicle systems, and wherein one or more vehicle systems associated with vehicle communications have a higher priority than one or more other vehicle systems of the one or more vehicle systems.

2. The computer-implemented method of claim 1, further comprising sending, by the first computing system, after the autonomous vehicle has operated in a second mode, one or more third control signals to the one or more control systems of the autonomous vehicle causing the autonomous vehicle to operate in the first mode.

3. The computer-implemented method of claim 2, further comprising determining, by the first or second computing system, whether the one or more control systems of the autonomous vehicle are operating within predefined operating parameters.

4. The computer-implemented method of claim 2, wherein sending, by the second computing system, the one or more third control signals to the one or more control systems of the autonomous vehicle causing the autonomous vehicle to operate in the first mode further comprises:
providing, by the second computing system, one or more third control signals to the one or more control systems of the autonomous vehicle causing the autonomous vehicle to autonomously drive from the location.

5. The computer-implemented method of claim 1, wherein power consumption of the autonomous vehicle is at least 50 percent less in the second mode as compared to the first mode.

6. The computer-implemented method of claim 1, wherein the autonomous vehicle is an automobile and wherein the autonomous vehicle is configured to provide a transportation service.

7. The computer-implemented method of claim 1, wherein the autonomous vehicle is included in a plurality of vehicles associated with a service provider.

8. The computer-implemented method of claim 1, wherein the first computing system is remote from the autonomous vehicle.

9. The computer-implemented method of claim 1, wherein the first computing system is on-board the autonomous vehicle.

10. The computer-implemented method of claim 1, further comprising:
autonomously determining, by the second computing system on-board the autonomous vehicle, the location to park the autonomous vehicle based at least in part on lighting around the location to park the autonomous vehicle.

11. A system for decreasing power consumption of an autonomous vehicle, the system comprising:
one or more processors; and
one or more memory devices, the one or more memory devices storing instructions that when executed by the one or more processors cause the one or more processors to perform operations, the operations comprising:
determining a predicted demand for a service at one or more geographic areas, wherein the service is provided by an autonomous vehicle to one or more users of the service, wherein the predicted demand is determined based, at least in part, on historical demand for the service;
autonomously determining on-board the autonomous vehicle a location to park the autonomous vehicle based at least in part on the predicted demand, cellular connectivity at the location to park, and the location to park being within a predetermined distance from the one or more geographic areas;
sending on-board the autonomous vehicle one or more first control signals to one or more control systems of the autonomous vehicle, the autonomous vehicle operating in a first mode, wherein the one or more first control signals cause the one or more control systems to autonomously park the vehicle at the location; and
sending on-board the autonomous vehicle, after the autonomous vehicle has autonomously parked at the location, one or more second control signals to the one or more control systems of the autonomous vehicle causing the autonomous vehicle to autonomously operate in a second mode, wherein the second mode requires less power than the first mode, and reduces power to one or more vehicle systems of the autonomous vehicle based at least in part on a priority of each of the one or more vehicle systems, and wherein one or more vehicle systems associated with vehicle communications have a higher priority than one or more other vehicle systems of the one or more vehicle systems.

12. The system of claim 11, wherein the operations further comprise sending, after the autonomous vehicle has operated in a second mode, one or more third control signals to the one or more control systems of the autonomous vehicle causing the autonomous vehicle to operate in the first mode.

13. The system of claim 12, wherein the operations further comprise determining whether the one or more control systems of the autonomous vehicle are operating within predefined operating parameters.

14. The system of claim 12, wherein sending the one or more third control signals to the one or more control systems of the autonomous vehicle causing the autonomous vehicle to operate in the first mode further comprises:
providing one or more third control signals to the one or more control systems of the autonomous vehicle causing the autonomous vehicle to autonomously drive from the location.

15. The system of claim 11, wherein the operations further comprise determining the location to park the autonomous vehicle.

16. The system of claim 11, further comprising:
autonomously determining on-board the autonomous vehicle the location to park the autonomous vehicle based at least in part on lighting around the location to park the autonomous vehicle.

17. An autonomous vehicle, comprising:
one or more control systems;
one or more processors; and
one or more memory devices, the one or more memory devices storing instructions that when executed by the one or more processors cause the one or more processors to perform operations, the operations comprising:
determining a predicted demand for a service at one or more geographic areas, wherein the service is provided by the autonomous vehicle to one or more users of the service, wherein the predicted demand is determined based, at least in part, on historical demand for the service;
autonomously determining on-board the autonomous vehicle a location to park the autonomous vehicle based at least in part on the predicted demand, cellular connectivity at the location to park, and the location to park being within a predetermined distance from the one or more geographic areas;
sending on-board the autonomous vehicle one or more first control signals to the one or more control systems of the vehicle while the vehicle is operating in a first mode, wherein the one or more first control signals cause the one or more control systems to autonomously park the vehicle at the location; and
sending on-board the autonomous vehicle, after the vehicle has autonomously parked at the location, one or more second control signals to the one or more control systems of the vehicle causing the vehicle to autonomously operate in a second mode, wherein the second mode requires less power than the first mode, and reduces power to one or more vehicle systems of the autonomous vehicle based at least in part on a priority of each of the one or more vehicle systems, and wherein one or more vehicle systems associated with vehicle communications have a higher priority than one or more other vehicle systems of the one or more vehicle systems.

18. The vehicle of claim 17, wherein the operations further comprise sending, after the vehicle has operated in a second mode, one or more third control signals to the one or more control systems of the vehicle causing the vehicle to operate in the first mode.

19. The vehicle of claim 18, wherein sending the one or more third control signals to the one or more control systems of the vehicle causing the vehicle to operate in the first mode further comprises:
   providing, by the one or more computing devices, one or more third control signals to the one or more control systems of the vehicle causing the vehicle to autonomously drive from the location.

20. The vehicle of claim 17, further comprising:
   autonomously determining on-board the autonomous vehicle the location to park the autonomous vehicle based at least in part on lighting around the location to park the autonomous vehicle.

* * * * *